Feb. 28, 1950     J. M. OBERHOLTZER     2,499,033
IMPACT DYNAMOMETER

Filed May 26, 1947

INVENTOR.
JOHN M. OBERHOLTZER
BY William P. Lane
ATTORNEY

Patented Feb. 28, 1950

2,499,033

UNITED STATES PATENT OFFICE 2,499,033

IMPACT DYNAMOMETER

John M. Oberholtzer, Los Angeles, Calif., assignor to North American Aviation, Inc.

Application May 26, 1947, Serial No. 750,426

10 Claims. (Cl. 73—141)

This invention relates to a device for measuring static as well as dynamic or impact loads.

It is an object of this invention to provide an arrangement whereby loads or forces may be measured directly and accurately.

It is a further object of this invention to adapt a force measuring device to enable the use of strain gauges therewith.

It is another object of this invention to provide a platform arrangement for measuring loads or forces, the parts constituting the same being so arranged that forces can be accurately measured even though they do not apply at the exact center of the platform.

It is yet another object of this invention to provide a force measuring device so arranged that strains developed in individual members comprising the device—due to the elasticity of the device and/or asymmetric application of force thereon—tend to cancel, leaving the measured strain as an indication of the applied force.

It is still another object of this invention to so position strain gauges in a load measuring device as to obtain an instrument of great sensitivity.

It is yet another object of this invention to provide in a force measuring device a beam of variable cross-section such that the strain in the outer fibers thereof remains constant under applied load.

It is still another object of this invention to provide in a force measuring device a strain gauge and a beam of variable cross-section to obtain high sensitivity and accurate measurements.

Further objects of invention will become apparent from the following description taken in connection with the attached drawings, in which Fig. 1 is a plan view of a device comprising the present invention;

Figure 1:
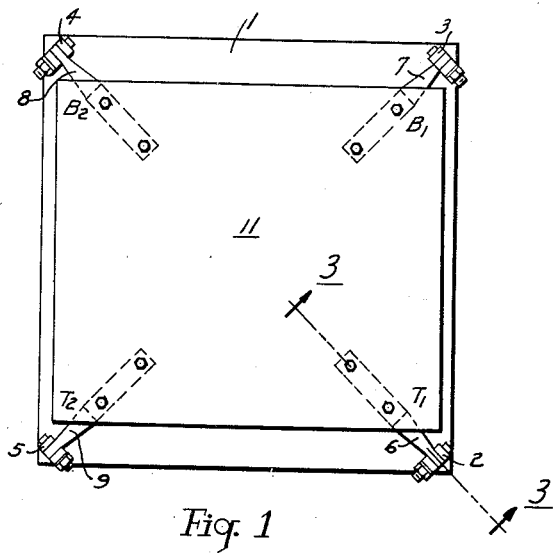
Figure 3:
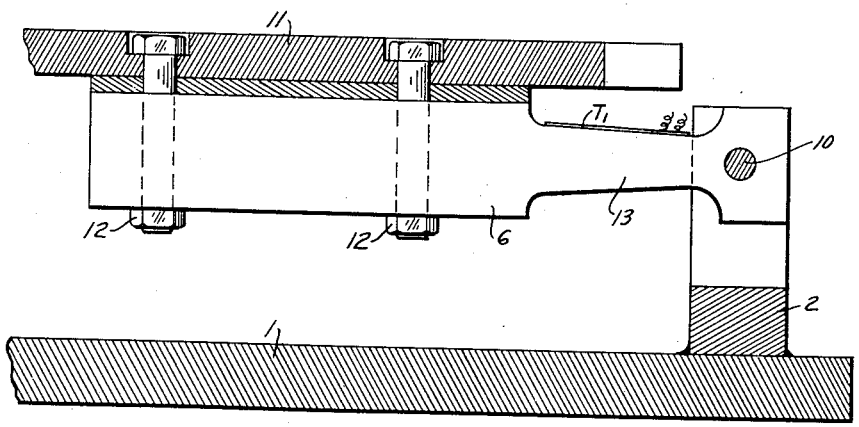
Fig. 3 is a sectional view along the line 3—3 of Fig. 1.

Referring to the drawings there is shown a base member 1 having rigidly attached thereto post members 2, 3, 4, and 5. These post members are bifurcated as shown in Fig. 3 to receive beam members 6, 7, 8, and 9, each of which is hingedly connected to its respective post member by a bolt such as 10. The beam members are rigidly attached at one end to platform 11 by bolts 12 or the like and are each reduced in cross-sectional area at the other end, as at 13 in Fig. 3, so as to obtain substantially constant strain in the outer fibers under applied load. In other words, since the bending moment in the beam varies according to its distance from the support, such as pin 10, the beam is reduced in section as it approaches the support to avoid breakage of the beam at any particular point and obtain greater responsiveness of strain gauges attached thereto. Attached to the necked-down portion 13 of each of the beams is a strain gauge of the type adapted to be attached to a member to measure changes in strain therein by reason of variation in resistance in response to the elongation or shortening of the gauge. Thus, resistance of the gauges increases in response to elongation and decreases in response to compression of the wire forming the same. These gauges are attached to the tops and bottoms of the beams in such a manner that each pair of opposed beams, as shown in Fig. 1, have gauges attached respectively to their top and bottom sides. Thus in the arrangement in Fig. 1 gauges $T_1$ $B_1$, $B_2$ and $T_2$ are associated respectively with beams 6, 7, 8, and 9, gauges $B_1$ and $B_2$ being located on the bottoms and gauges $T_1$ and $T_2$ being located on the tops of their respective beams.

Figure 4:
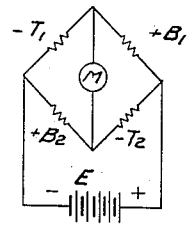
Fig. 4 is a plan view of a Wheatstone bridge arrangement used in connection with the invention.
Figure 2:
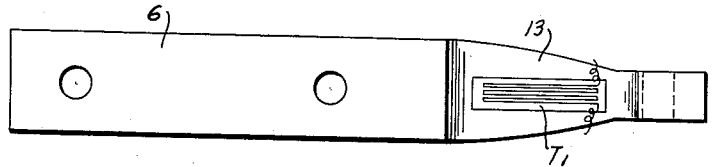
Fig. 2 is a detail view of one of the beam members showing a strain gauge attached thereto.

The gauges are connected by suitable wiring in a circuit forming a Wheatstone bridge containing a suitable source of electrical energy E as illustrated in Fig. 4. Plus signs are given to the gauges located on the bottoms of the beams by reason of the fact that the fiber stress in such part under an impact load will be in tension and the resistance of the gauge will increase or change to a plus value when the load is applied or increased. Minus signs are applied to those gauges located on the top or upper side of the beams and in which the resistance in the gauge decreases upon application of the load to the platform and beams.

As illustrated in the Wheatstone bridge in Fig. 4 adjacent gauges are of opposite sign to provide increased sensitivity. By means of these arrangements any effect on the gauges as a result of tendency of the platform to stretch under impact loads or asymmetric loading conditions is effectively nullified. Likewise, by reason of the fact that adjacent gauges are of opposite sign, the sensitivity of the platform is substantially increased.

A meter M which may be in the form of a recording galvanometer, or other suitable indicator, may be connected across the Wheatstone bridge as indicated in Fig. 4.

In the operation of the device the base 1 is positioned so that platform 11 may receive an impact load at approximately the center thereof. Electricity is caused to flow from the source of electrical energy E through the Wheatstone bridge, the device M indicating zero force. Upon a force being applied to platform 11 the strain gauges on the bottoms of the beams are tensioned, and those on the tops of the beams are compressed, thus changing the electrical resistance thereof in such a manner that the Wheatstone bridge circuit in which these strain gauges form a part vary in resistance and cause a circuit to flow through the recording galvanometer to constitute a measure of the force. Since opposed beams have their respective strain gauges oppositely positioned, no indication is obtained in the meter because of any stretching or elongation of the platform under impact. This result is obtained by reason of the fact that opposed beams have their respective strain gauges located in adjacent legs of the bridge circuit, resulting in the cancellation of like strains and the summation of unlike strains, the latter being shown on the indicating meter. Thus, adjacent legs in the bridge circuit, as illustrated in Fig. 4, are of variable resistance in response to loading stress in the beams with which they are associated. Such stress being opposite in nature (one being tensile and the other compression), their combined result will be additive in adjacent bridge legs. Tensile and compression forces common to both opposite legs will tend to cancel. This result obtains by reason of the fact that stretching occurs in the same direction on opposed gauges such as $T_1$ and $B_2$, irrespective of the fact that they are located on the tops and bottoms of their respective beams. Accordingly, the only indication obtained is that of bending moment transmitted to the beams as a result of applied load, this indication being an accurate summation irrespective of the point of application of the load to the platform, or stretching of the platform thereunder. Accurate measurement is obtained irrespective of off-center loading by reason of the fact that, in the arrangement shown and described, forces applied to opposed beams are additive.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An impact measuring device comprising a platform for directly receiving impact loads, beam means rigidly attached to the corners of said platform for supporting the same, electrical strain gauge means bonded to said beam means to measure strain therein resulting from said impact loads, and means for indicating the measured strain.

2. An impact measuring device comprising a platform for directly receiving impact loads, beam means of constant outer fiber strength integral with the corners of said platform for supporting the same, electrical strain gauge means bonded to said beam means to measure stress therein resulting from impact loads, and means for indicating the measured stress.

3. A force measuring device comprising a platform for directly receiving impact loads, opposed beam means integral with said platform for supporting the same, electrical strain gauge means bonded to the upper and lower sides respectively of said opposed beam means and operatively connected to measure stress therein as a result of applied force, and means for indicating the measured stress.

4. A force measuring device comprising a platform for directly receiving impact loads, opposed beam means rigidly attached to the corners of said platform at opposite sides thereof, electrical strain gauge means bonded to said beam means to measure stress therein resulting from forces applied thereto, and means for indicating the measured stress.

5. A device as recited in claim 4 in which said electrical strain gauge means are connected in the form of a Wheatstone bridge wherein the strain gauge means on opposed beam means constitute adjacent legs of the bridge.

6. A force measuring device comprising a base, post members integral with said base, a platform for directly receiving impact loads and having beam means integral therewith hingedly attached to said post members, electrical strain gauge means bonded to said beam means to measure the stress therein resulting from impact force applied to said platform, and means for indicating the measured stress.

7. A device as recited in claim 6 in which said beam members are of constant outer fiber strength and in which said electrical strain gauge means are bonded respectively to the tops and bottoms of said beam means.

8. A device as recited in claim 6 in which said electrical strain gauge means are bonded respectively to the tops and bottoms of said beam means, said strain gauge means forming a Wheatstone bridge arrangement in which opposed gauges constitute adjacent legs in said Wheatstone bridge.

9. A force measuring device comprising a platform for directly receiving impact loads, opposed beam means rigidly attached to said platform at opposite sides thereof, electrical strain gauge means bonded to the tops and bottoms respectively of said opposed beam means to measure stress therein resulting from forces applied thereto, and means for indicating the measured stress.

10. A force measuring device comprising a platform for directly receiving impact loads, opposed beam means of constant outer fiber strength rigidly attached to said platform at opposite sides thereof, electrical strain gauge means bonded to the tops and bottoms respectively of said opposed beam means to measure stress therein resulting from forces applied thereto, and means for indicating the measured stress.

JOHN M. OBERHOLTZER.

REFERENCES CITED

The following references are of record in the file of this patent:

UNITED STATES PATENTS

| Number | Name | Date |
| --- | --- | --- |
| 1,046,063 | Felt | Dec. 3, 1912 |
| 1,921,624 | Lewis | Aug. 8, 1933 |
| 2,213,982 | Frey et al. | Sept. 10, 1940 |
| 2,322,319 | Ruge | June 22, 1943 |
| 2,350,722 | Buckingham | June 6, 1944 |
| 2,359,245 | Ritzmann | Sept. 26, 1944 |

OTHER REFERENCES

The Glenn L. Martin Co., Engineering Report No. 1526, entitled "A Simple Moment or Force Measuring Instrument," published December 17, 1941, pages 7, 8 and 9. (Copy in Division 60 of U. S. Patent Office.)